United States Patent [19]

Shirota et al.

[11] Patent Number: 5,074,914

[45] Date of Patent: Dec. 24, 1991

[54] RECORDING LIQUID AND INK-JET RECORDING METHOD MAKING USE OF IT

[75] Inventors: Katsuhiro Shirota, Kawasaki; Kazuo Iwata, Yokohama, both of Japan

[73] Assignee: Canon Kabushiki Kaisha, Tokyo, Japan

[21] Appl. No.: 607,764

[22] Filed: Oct. 30, 1990

Related U.S. Application Data

[63] Continuation-in-part of Ser. No. 425,605, Oct. 23, 1989, abandoned.

[30] Foreign Application Priority Data

Oct. 25, 1988 [JP] Japan .................................. 63-267111
Oct. 2, 1989 [JP] Japan .................................. 1-257325

[51] Int. Cl.$^5$ ............................................. C09D 11/02
[52] U.S. Cl. ......................................... 106/22; 106/20
[58] Field of Search ................................ 106/20, 22

[56] References Cited

U.S. PATENT DOCUMENTS

| | | | |
|---|---|---|---|
| 4,365,998 | 12/1982 | Sugiyama et al. | 106/22 |
| 4,512,807 | 4/1985 | Ogawa et al. | 106/22 |
| 4,631,085 | 12/1986 | Kawanishi et al. | 106/22 |
| 4,931,550 | 6/1990 | Quayle et al. | 106/22 |

FOREIGN PATENT DOCUMENTS

| | | |
|---|---|---|
| 57-030773 | 2/1982 | Japan . |
| 174472 | 10/1983 | Japan .................................. 106/22 |
| 62-190275 | 8/1987 | Japan . |
| 63-046259 | 2/1988 | Japan . |
| 63-046260 | 2/1988 | Japan . |

*Primary Examiner*—William R. Dixon, Jr.
*Assistant Examiner*—Helene Klemanski
*Attorney, Agent, or Firm*—Fitzpatrick, Cella, Harper & Scinto

[57] ABSTRACT

A recording liquid including a recording agent which is a component that forms a recorded image and a liquid medium in which said recording agent is dissolved or dispersed, wherein said recording agent comprises a dye (A) C.I. Reactive Red 23 and a dye (B) represented by $R_1C_6H_3(SO_3M)_n-N=N-C_{10}H_3(OH)(NHR_2)(SO_3M)_2$, wherein $R_1$ represents H, halogen atom, carboxyl or alkyl; $R_2$ represents $-COCH_3$, $-SO_2C_6H_4CH_3$ or $-COC_6H_4R_3$, where $R_3$ represents H or Cl; M represents a base; and n represents either 0 or 1. An ink-jet recording method comprises applying a droplet of the recording liquid to a recording medium to carry out recording.

36 Claims, 3 Drawing Sheets

RECORDING LIQUID AND INK-JET RECORDING METHOD MAKING USE OF IT

This application is a continuation-in-part of patent application Ser. No. 425,605 filed Oct. 23, 1989, now abandoned.

BACKGROUND OF THE INVENTION

1. Field of the Invention

The present invention relates to a recording solution, and an ink-jet recording method making use of the solution. More particularly, it relates a recording liquid capable of giving a recorded image with a superior tone sharpness, light-resistance and gas resistance, and an ink-jet recording method making use of this liquid.

2. Related Background Art

Hitherto having been used as inks in writing utensils such as fountain pens and felt pens are recording liquids comprising various types of dyes dissolved in water or other organic solvents.

Inks comprising various types of dyes dissolved in water or other organic solvent are also used in ink-jet systems in which recording is performed by ejecting ink from an ejection orifice provided in a recording head, by the action of the oscillation attributable to a piezoelectric oscillator or the electrostatic force attributable to the application of a high voltage. The inks for ink-jet systems, however, are required to satisfy more severe conditions with respect to many performances than those required in the writing utensils such as fountain pens and felt pens commonly used.

The ink-jet systems make less noise and can perform high-speed recording or color recording on plain paper without taking any particular fixing step, and researches have been energetically made on various types.

Various methods are available for systems of this type, but all of them are required to have the performances such that the physical properties such as viscosity and surface tension are within the range of suitability, the recording agent has a dissolution satability high enough not to cause clogging of the minute ejection orifice, a recorded image can be obtained in a sufficiently high density, and changes in the values of physical properties, precipitation of solid contents, or the like may not occur during storage.

In addition to the above performances, they are also required to have the properties that the recording can be performed without limitation on the type of recording members, they can achieve a high fixing speed, and they can give a recorded image with excellent water resistance, solvent resistance (resistance to alcohol, in particular), light-resistance, wear resistance, and resolution.

Among these, particularly in relation to magenta color recording, recorded images tend to undergo color fading by light irradiation, in other words, have a poor light-resistance, causing a great problem. Thus, inks improved to eliminate these disadvantages have been strongly sought.

From such viewpoints, many proposals relating to inks have been made. For example, Japanese Patent Application Laid-Open No. 57-30773, No. 63-46259 and No. 63-46260 propose to use monoazo metal complex dyes. Such metal-containing dyes, however, involve the disadvantages that they lack tone sharpness, and have a poor color reproducibility when a color image is formed. Moreover, records obtained using the metal-containing dyes (in particular, records made on a coated paper containing silica on its surface) commonly undergo color fading due to gas in the air in addition to the color fading due to light, when they are stuck on a wall in the room. This phenomenon is particularly remarkable when they are stuck near a copying machine. Because of the disadvantages involved as mentioned above, it is difficult to use the metal-containing dyes alone.

Japanese Patent Application Laid-Open No. 62-190275 proposes to use by mixture a monoazo metal-free dye achievable of a sharp tone and a monoazo metal-containing dye. This method can obtain a record which is good and well-balanced in both tone and light-resistance. However, the gas resistance as questioned in the above has not been satisfactorily improved.

SUMMARY OF THE INVENTION

Accordingly, an object of the present invention is to provide a novel recording liquid that has overcome the above disadvantages in the prior art and satisfies the tone sharpness, light-resistance and gas resistance at the same time.

Another object of the present invention is to provide a recording liquid that tends not to cause clogging of orifices and changes of properties or generation of precipitates during storage, and also has a superior recording performance, ejection stability and ejection responce.

Still another object of the present invention is to provide an ink-jet recording method that can give an image having a superior tone sharpness, light-resistance and gas resistance even when the coated paper containing silica on its surface is used.

The above objects can be attained by the invention described below.

The present invention provides a recording liquid comprising a recording agent which is a component that forms a recorded image and a liquid medium in which said recording agent is dissolved or dispersed, wherein said recording agent comprises a dye (A) C.I. Reactive Red 23 and a dye (B) represented by the following general formula; said dyes being contained in a proportion ranging from 10:1 to 1:10 in weight ratio.

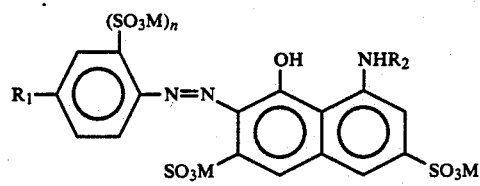

wherein $R_1$ represents a hydrogen atom, a halogen atom, a carboxyl group, or an alkyl group; $R_2$ represents a group $COCH_3$,

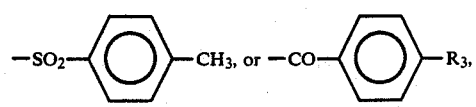

where $R_3$ represents a hydrogen atom or a chlorine atom; M represents a base selected from the group consisting of an alkali metal group, and an ammonium group; and n represents either 0 or 1.

The present invention also provides an ink-jet recording method comprising applying a droplet of a recording liquid to a recording medium to carry out recording, wherein said recording liquid comprises a dye (A) C.I. Reactive Red 23 and a dye (B) represented by the following general formula; said dyes being contained in a proportion ranging from 10:1 to 1:10 in weight ratio.

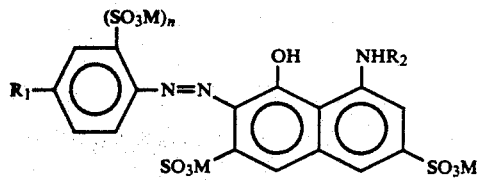

wherein $R_1$ represents a hydrogen atom, a halogen atom, a carboxyl group, or an alkyl group; $R_2$ represents a group

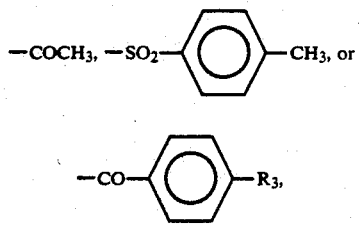

where $R_3$ represents a hydrogen atom or a chlorine atom; M represents a base selected from the group consisting of an alkali metal group, and an ammonium group; and n represents either 0 or 1.

DETAILED DESCRIPTION OF THE PREFERRED EMBODIMENTS

Figure 1A:
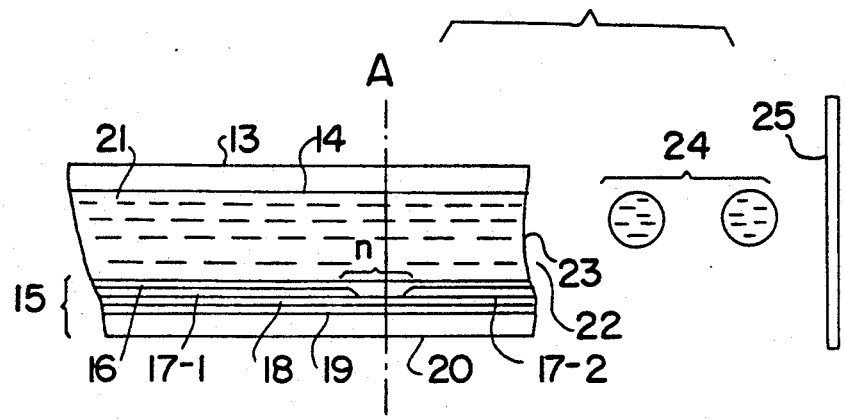
FIGS. 1(a) and 1(b) are respectively a longitudinal sectional view and a cross-sectional view of the head part of an ink jet recording device.

To achieve the objects of the present invention, the present inventors made detailed studies on dyes serving as recording agent components of inks, in particular, on magenta dyes. As a result, they found that a specific combination of dyes is preferred as the recording agent of inks, particularly as the recording agent of inks used in the ink-jet systems, and employment of such a specific combination of dyes as the recording agent of inks can bring about an ink capable of giving a recorded image that satisfies tone sharpness, light-resistance and gas resistance at the same time and also satisfies water resistance, resolution, alcohol resistance, and other required performances, when used in the ink-jet systems.

The present invention will now be described below in greater detail by giving preferred embodiments.

The dye (A) C.I. Reactive Red 23 (16202) used in the present invention is a dye having the following chemical structure, which is a dye with excellent light-resistance.

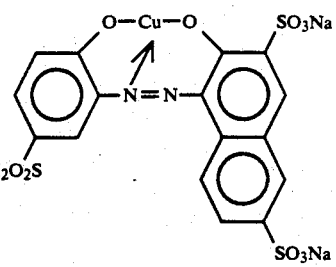

The dye (B) used in the present invention, represented by the general formula, is a dye with excellent tone sharpness. The dye (B) includes any dyes so long as it is included in the general formula, but particularly preferred examples thereof include the following. These are exemplified mainly as sodium salts, but may also be formed into salts with any bases, such as lithium salts, potassium salts, ammonium salts and so forth.

Exemplary Compound B-1

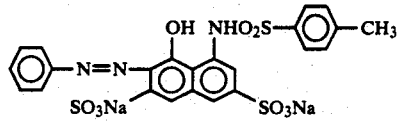

Exemplary Compound B-2

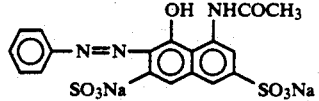

Exemplary Compound B-3

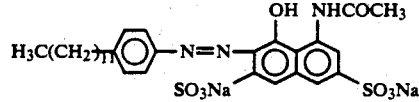

Exemplary Compound B-4

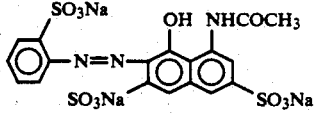

Exemplary Compound B-5

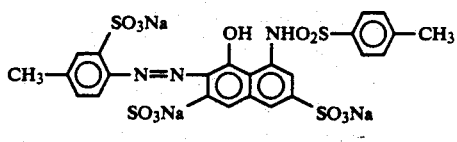

Exemplary Compound B-6

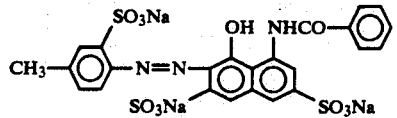

Exemplary Compound B-7

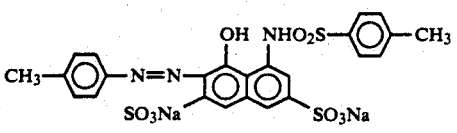

Exemplary Compound B-8

-continued

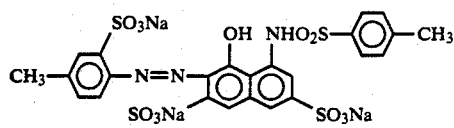

Exemplary Compound B-9

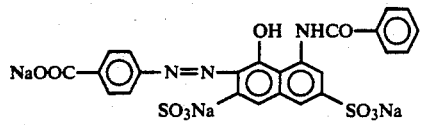

Exemplary Compound B-10

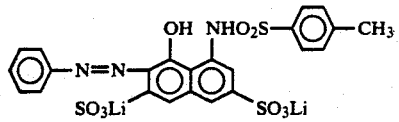

Exemplary Compound B-11

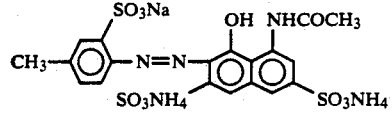

Exemplary Compound B-12

On the above-exemplified compounds, the compound B-6 is particularly preferred for the present invention, as later and concretely described in EXAMPLES.

The present invention is mainly characterized by the use in combination of the dyes (A) and (B) as described above. An ink resulting from such a specific combination can give a recorded image concurrently having very superior tone sharpness, light-resistance and gas resistance, compared with conventional inks of the same kinds of colors in the prior art.

The total content of the above dyes is determined depending on the type of the liquid medium component and the performances required in inks, but, in general, may be in the range of from 0.1 to 20% by weight, preferably from 0.5 to 15% by weight, and more preferably from 1 to 10% by weight, based on the total weight of an ink. As to the amount of these dyes used, the effect of the present invention can be most remarkably achieved when the dyes (A) and (B) are used in a proportion of from 10:1 to 1:10, and preferably from 7:3 to 3:7, in weight ratio in the total weight of the dyes. In addition to these specific dyes, it is of course possible to use other various dyes such as direct dyes and acid dyes in combination.

The liquid medium preferably used in the ink of the present invention is water or a mixed solvent comprising water and a water soluble organic solvent. Particularly preferred is the mixed solvent comprising water and a water soluble organic solvent, and containing a polyhydric alcohol as the water-soluble organic solvent, which has the effect of preventing evaporation of ink. As the water, it is preferred not to use common water, containing various ions, but deionized water. The water-soluble organic solvent used by mixture with water includes, for example, alkyl alcohols having 1 to 4 carbon atoms, such as methyl alcohol, ethyl alcohol, n-propyl alcohol, isopropyl alcohol, n-butyl alcohol, sec-butyl alcohol, tert-butyl alcohol and isobutyl alcohol; amides such as dimethylformamide and dimethylacetamide; ketones or ketoalcohols such as acetone and diacetone alcohol; ethers such as tetrahydrofuran and dioxane; polyalkylene glycol such as polyethylene glycol and polypropylene glycol; alkylene glycols comprising an alkylene group having 2 to 6 carbon atoms, such as ethylene glycol, propylene glycol, butylene glycol, triethylene glycol, 1,2,6-hexanetriol, thiodiglycol, hexylene glycol and diethylene glycol; glycerol; lower alkyl ethers of polyhydric alcohols, such as ethylene glycol methyl or ethyl ether, diethylene glycol methyl or ethyl ether, triethylene glycol methyl or ethyl ether; N-methyl-2-pyrrolidone, and 1,3-dimethyl-2-imidazolidinone. Of these many water-soluble organic solvents, preferred are polyhydric alcohols such as diethylene glycol, and lower alkyl ethers of polyhydric alcohols, such as triethylene glycol monomethyl or monoethyl ether.

The above water-soluble organic solvent may be contained in the ink in an amount of generally from 5 to 90% by weight, preferably from 5 to 80% by weight, and more preferably from 5 to 40% by weight, based on the total weight of the ink.

The content of the water used in the mixed solvent is determined in a vast range, depending on the type of the above solvent component, the composition thereof and the desired performances of inks, but should be within the range covering generally from 10 to 95%, preferably 50 to 95%, and more preferably from 60 to 95%, based on the total weight of the ink.

The ink of the present invention, made up with these components can be an excellent ink well balanced by itself in all the recording performances (such as signal response, droplet-forming stability, ejection stability, long-time continuous recording performance, and ejection stability after long-time stoppage of recording), shelf stability, and fixability to recording mediums, as well as the tone sharpness, light-resistance, gas resistance, water resistance and alcohol resistance of recorded images. For the purpose of further improving these performances, all sorts of conventionally known additives may also be further added and contained.

They include, for example, viscosity modifiers such as polyvinyl alcohol, celluloses and water-soluble resins; surface tension modifiers such as all sorts of cationic, anionic or nonionic surface active agents, diethanolamine and triethanolamine; pH adjusters through buffer solution, and mildewproofing agents.

A specific-resistance modifier comprised of inorganic salts and so forth such as lithium chloride, ammonium chloride or sodium chloride is also added in order to prepare inks used in ink-jet systems of the type in which the ink is electrostatically charged.

Values of thermal properties as exemplified by specific heat, thermal expansion coefficient and thermal conductivity may often be modified in instances in which the ink is used in ink-jet systems of the type the ink is ejected by the action of heat energy.

The ink of the present invention, as described above, is useful as inks for use in making records using various writing utensils, recording tools, etc., and particularly useful as inks for use in ink-jet systems. The ink-jet systems mentioned herein include any systems so long as they are systems in which an ink can be effectively released from a nozzle and applied to a recording medium serving as a target.

The ink of the present invention is preferably used in the ink jet recording method in which ink droplets are discharged by employing thermal energy. However, the ink can also be used for general writing utensils.

An example of the recording apparatus which is preferable for recording by using the ink of the present invention is an apparatus in which ink droplets are produced by applying heat energy to the ink in the chamber of a recording head in correspondence with a recording signal.

Figure 1B:
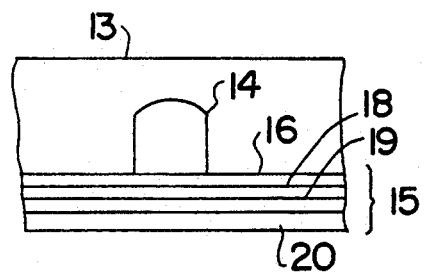
Figure 2:
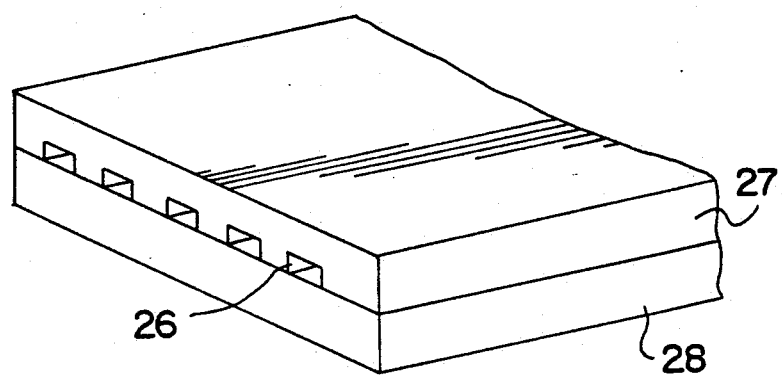
FIG. 2 is a perspective view of the appearance of a multiple head which comprises the head shown in FIG. 1.

FIGS. 1(a), 1(b) and 2 show examples of the structure of a head, which is a principal part of an ink jet recording apparatus.

In the drawings, a head 13 is formed by bonding a glass, ceramic or plastic plate, which has a groove 14 for allowing ink to pass therethrough, and a heating head 15 used for heat-sensitive recording. Although a thin film head is shown in the drawings, the head is not limited to such an embodiment. The heating head 15 comprises a protective film 16 made of silicon oxide or the like, aluminum electrodes 17-1, 17-2, a heating resistor layer 18 made of nichrome or the like, a heat-accumulating layer 19 and a substrate 20 made of aluminum or the like and having good heat radiation properties.

Ink 21 reaches a discharging orifice (micropore) 22 and forms a meniscus 23 at pressure P.

When an electrical signal is applied to the electrodes 17-1, 17-2, a region off the heating head 15, which is denoted by n, rapidly generates heat so as to generate air bubbles in the ink 21 which contacts with the region. The meniscus 23 is projected by the pressure generated, and the ink 21 is discharged as a jet of ink droplets 24 from the orifice 22. The droplets 24 are propelled toward a recording material 25. FIG. 2 shows a multiple head comprising a plurality of the heads shown in FIG. 1(a) which are arranged in parallel. The multihead is formed by bonding a glass plate 27 having a plurality of grooves 26 and a heating head 28, which is the same as that shown in FIG. 1(a).

FIG. 1(a) is a sectional view taken along the ink flow channel of the ink, and FIG. 1(b) is a sectional view taken along the line A-B in FIG. 1(a).

Figure 3:
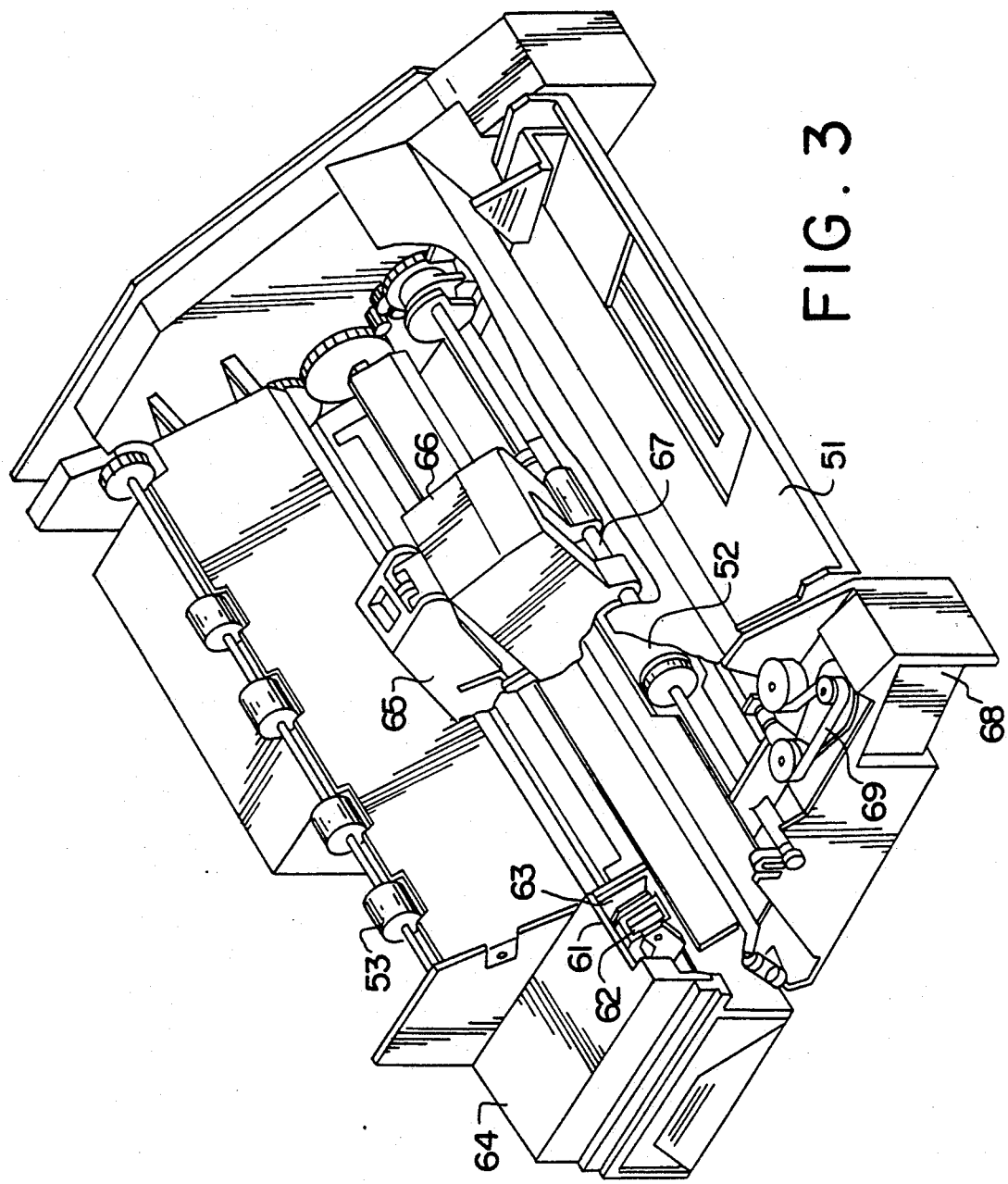
FIG. 3 is a perspective view of an example of an ink jet recording apparatus.

FIG. 3 shows an example of an ink jet recording apparatus in which the head shown in FIG. 1 is incorporated.

In FIG. 3, reference numeral 61 denotes a blade serving as a wiping member in the form of a cantilever in which one end is a fixed end held by a blade holding member. The blade 61 is disposed at a position adjacent to a region of recording by a recording head. In this example, the blade 61 is held in a position in which it projects in the path of the movement of the recording head. Reference numeral 62 denotes a cap which is disposed at a home position adjacent to the blade 61 and which is moved in the direction vertical to the moving direction of the recording head so as to contact with the orifice surface for the purpose of capping. Reference numeral 63 denotes an ink absorber which is disposed at a position adjacent to the blade 61 and which is held in a position in which it projects in the path of the movement of the recording head in the same way as the blade 61. The blade 61, the cap 62 and the absorber 63 form a discharging recovery part 64. Moisture and dust on the ink orifice surface are removed by the blade 61 and the absorber 63.

Reference numeral 65 denotes the ink jet device which has a means for generating discharging energy so as to record an image by discharging the ink to the recording material opposite to the orifice surface having orifices. Reference numeral 66 denotes a carriage for moving the ink jet device 65 which is loaded thereon. The carriage 66 is slidably engaged with a guide shaft 67 and is partially connected (not shown) to a belt 69 which is driven by a motor 68. This permits the carriage 66 to move along the guide shaft 67 and move in the region of recording by the ink jet device 65 and the region adjacent thereto.

Reference numeral 51 denotes a sheet feeding part, and reference numeral 52 denotes a sheet feeding roller which is driven by a motor (not shown). This arrangement allows the recording paper to be fed to a position opposite to the orifice surface of the recording head and to be delivered to take-off part having a take-off roller 53 during the progress of recording.

In the aforementioned arrangement, when the ink jet device 65 is returned to the home position at the end of recording, the cap 62 is retracted from the path of the movement of the ink jet device 65, while the blade 61 is projected in the path of the movement. As a result, the orifice surface of the ink jet device 65 is wiped by the blade 61. When the cap 62 contacts with the orifice surface of the recording head 65 so as to cap it, the cap 62 is moved so as to project in the path of the movement of the ink jet device 65.

When the ink jet device 65 is moved from the home position to the recording start position, the cap 62 and the blade 61 are at the same positions as the above-described positions in wiping. As a result, the orifice surface of the ink jet device 65 is wiped even during the movement of the ink jet device 65.

The ink jet device 65 is moved to the home position adjacent to the recording region not only at the end of recording and during the recovery of discharging (the operation of sucking an ink from an orifice in order to recover the normal discharge of an ink from an orifice), but also at predetermined intervals when it is moved in the recording region for the purpose of recording. This movement causes the above-described wiping.

Figure 4:
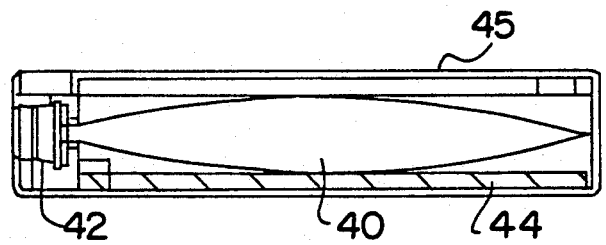
FIG. 4 is a longitudinal sectional view of an ink cartridge.

FIG. 4 is a drawing which shows an example of an ink cartridge 45 for containing the ink to be supplied to the head through an ink supply tube. In the drawing, reference numeral 40 denotes an ink bag for containing the ink to be supplied which has a rubber stopper 42 at its one end. When a needle (not shown) is inserted into the stopper 42, the ink contained in the ink bag 40 can be supplied to the ink jet device 65. Reference numeral 44 denotes an ink absorber for absorbing waste ink. As the ink bag in the present invention, there may preferably be used ones of which the surface coming into contact with the ink is formed from polyolefins, in particular polyethylene.

The ink jet recording apparatus used in the present invention is not limited to an apparatus in which a device and an ink cartridge are separately disposed, as described above. The ink jet device shown in FIG. 5 in which a device and an ink cartridge are integrated can be preferably used in the present invention.

Figure 5:
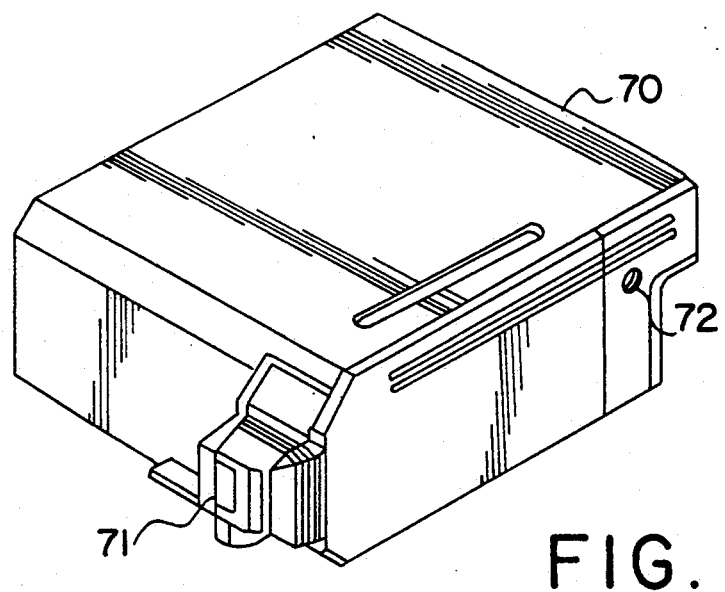
FIG. 5 is a perspective view of an ink jet device.

In FIG. 5 reference numeral 70 denotes an ink jet device which contains an ink storing member impregnated with ink. The ink in the ink storing member is discharged as ink droplets from a head part 71 having a plurality of orifices. Further, as the ink storing member, there may be used an ink absorber or an ink bag. The head is the same as those referred to in FIGS. 1 and 2.

Reference numeral 72 denotes a communicating hole for allowing the inside of the device 70 to communicate with the atmosphere. As a material for the ink absorber in the present invention, there may preferably be used polyurethanes.

The ink jet device 70 is used in place of the ink jet device 65 shown in FIG. 3 and is detachably provided on the carriage 66.

As described above, the ink of the present invention comprises the dyes mixed in a specific combination. Thus, not only as ink used in general recording but also particularly as ink used in ink-jet systems, it particularly gives a recorded image having superior tone sharpness, light-resistance, gas resistance, water resistance, alcohol resistance, resolution and so forth. It also has superior recording performances such as long-term shelf stability, ejection stability and ejection response, and exhibits superior ink-fixing properties when it is applied on the recording medium.

EXAMPLES

The present invention will be described below in still greater detail by giving Examples, Comparative Examples, and Use Example. In the following, "part(s)" or "%" is by weight unless particularly mentioned.

EXAMPLE 1

| | | |
|---|---|---|
| C.I. Reactive Red 23 | 1.5 | parts |
| Exemplary Compound B-2 | 1.5 | parts |
| Diethylene glycol | 20 | parts |
| Ethylene glycol | 10 | parts |
| Ion-exchanged water | 67 | parts |

The above components were thoroughly mixed and dissolved in a vessel, and the solution was pressure-filtered using a Teflon filter having a pore diameter of 1 μm, followed by deaeration treatment using a vacuum pump to obtain an ink of the present invention.

EXAMPLES 2 TO 6

Inks of the present invention, as shown in Table 1 below, were prepared in the same manner as Example 1.

COMPARATIVE EXAMPLE 1

| | | |
|---|---|---|
| C.I. Reactive Red 23 | 3 | parts |
| Diethylene glycol | 20 | parts |
| Ethylene glycol | 10 | parts |
| Ion-exchanged water | 67 | parts |

An ink of the comparative example was prepared in the same manner as Example 1, but using the above components.

COMPARATIVE EXAMPLE 2

| | | |
|---|---|---|
| Exemplary Compound B-2 | 3 | parts |
| Diethylene glycol | 20 | parts |
| Ethylene glycol | 10 | parts |
| Ion-exchanged water | 67 | parts |

An ink of the comparative example was prepared in the same manner as Example 1, but using the above components.

COMPARATIVE EXAMPLES 3 TO 9

Inks of the comparative examples, as shown in Table 1 below, were prepared in the same manner as Example 1.

USE EXAMPLE

Using the inks of the present invention and the comparative examples, obtained in the above, recording was carried out using a recording apparatus having multiple heads of an on-demand type in which recording is performed by applying heat energy to the ink in the recording heads to generate droplets (ejection orifice diameter: 35 μm; resistivity of heating resistance element: 150 Ω; driving voltage: 30 V; frequency: 2 KHz), to obtain the results as shown in Table 1 below. Used as recording paper was a commercially available ink-jet recording paper IJ Mat Coat M (available from Mitsubishi Paper Mills, Ltd.), having a silica-coated layer on its surface.

The valuation as shown in Table 1 was based on the following criteria.

The light-resistance was based on changes in chromaticity (color difference ΔE) measured after irradiation for 100 hours using a xenon fademeter, and evaluated according to the following criterions. Ranks A and B were regarded as acceptable records.

| ΔE | Rank |
|---|---|
| 0 to 5 | A |
| 5 to 10 | B |
| 10 to 20 | C |
| 20 to 30 | D |
| Not less than 30 | E |

The gas resistance was based on changes in chromaticity (color difference ΔE) measured on records stuck on the wall for 3 months with a distance of 1.5 m from the copying machine, and evaluated according to the following criteria. Ranks A and B were regarded as acceptable records.

| ΔE | Rank |
|---|---|
| 0 to 3 | A |
| 3 to 8 | B |
| 8 to 13 | C |
| 13 to 18 | D |
| Not less than 18 | E |

The tone was based on visual observation.

Dyes other than the dyes (A) and (B) used in Comparative Example are the following dyes.

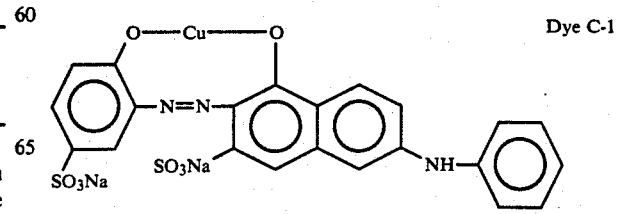

Dye C-1

-continued

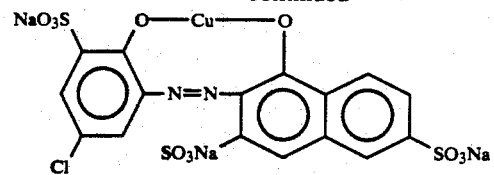

Dye C-2

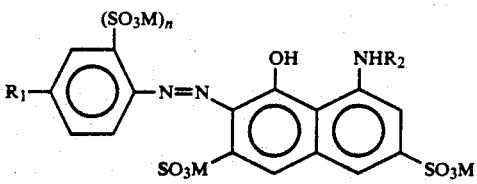

The inks shown in Table 1 have the following composition.

| Ink Composition 1 | |
| --- | --- |
| Dyes | 3 parts (in total) |
| N-methyl-2-pyrrolidone | 15 parts |
| Diethylene glycol | 10 parts |
| Ion-exchanged water | 72 parts |
| Ink Composition 2 | |
| Dyes | 4 parts (in total) |
| Glycerol | 10 parts |
| Ethylene glycol | 20 parts |
| Ion-exchanged water | 76 parts |
| Ink Composition 3 | |
| Dyes | 2.5 parts (in total) |
| Diethylene glycol | 20 parts |
| Glycerol | 5 parts |
| Ion-exchanged water | 72.5 parts |

TABLE 1

| Ink | Dye(s) used | Dye mixing ratio | Ink composition | Light resistance | Gas resistance | Tone |
| --- | --- | --- | --- | --- | --- | --- |
| Example: | | | | | | |
| 1 | C.I. RR 23 + (B-2) | (As above) | | A | B | Sharp |
| 2 | C.I. RR 23 + (B-1) | 7:3 | 1 | A | B | Sharp |
| 3 | C.I. RR 23 + (B-3) | 6:4 | 1 | A | B | Sharp |
| 4 | C.I. RR 23 + (B-6) | 4:6 | 2 | A | A | Sharp |
| 5 | C.I. RR 23 + (B-8) | 3:7 | 3 | B | A | Sharp |
| 6 | C.I. RR 23 + (B-10) | 1:9 | 3 | B | A | Sharp |
| Comparative Example: | | | | | | |
| 1 | C.I. RR 23 alone | (As above) | | A | C | Somber |
| 2 | (B-2) alone | (As above) | | D | A | Sharp |
| 3 | C.I. RR 23 alone | — | 1 | A | C | * |
| 4 | (B-2) alone | — | 1 | E | A | Sharp |
| 5 | (B-11) alone | — | 2 | E | B | Sharp |
| 6 | (C-1) + (B-2) | 7:3 | 2 | A | E | ** |
| 7 | C-2) + (B-3) | 6:4 | 3 | B | D | ** |
| 8 | (C-1) alone | — | 3 | A | E | * |
| 9 | (C-2) alone | — | 3 | B | E | * |

*: Lacking in chroma; **: slightly lacking in chroma

Further, with respect to each ink in Examples 1 to 6, the ink absorber of the ink-jet device as shown in FIG. 5 was impregnated with the ink. Then the ink jet printer as shown in FIG. 3 was allowed to carry the ink-jet device. By use of the ink jet printer, recording was performed. As a result, good recording which was excellent in a discharge property could be realized.

We claim:

1. A recording liquid comprising a recording agent which is a component that forms a recorded image and a liquid medium in which said recording agent is dissolved or dispersed, wherein said recording agent comprises a dye (A) C.I. Reactive Red 23 and a dye (B) represented by the following general formula; said dyes being contained in a proportion ranging from 10:1 to 1:10 in weight ratio,

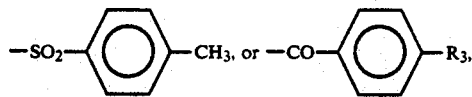

wherein $R_1$ represents a hydrogen atom, a halogen atom, a carboxyl group, or an alkyl group; $R_2$ represents a group $COCH_3$, $$-SO_2-\bigcirc-CH_3, \text{ or } -CO-\bigcirc-R_3,$$

where $R_3$ represents a hydrogen atom or a chlorine atom; M represents a base selected from the group consisting of an alkali metal group, and an ammonium group; and n represents either 0 or 1.

2. A recording liquid according to claim 1, wherein said dyes (A) and (B) are mixed in a proportion ranging from 7:3 to 3:7 in weight ratio.

3. A recording liquid according to claim 1, wherein said dye (B) represented by said general formula is a dye represented by the following formula:

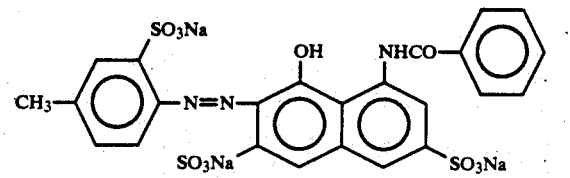

4. A recording liquid according to claim 1, wherein said liquid medium comprises water and a water-soluble organic solvent.

5. A recording liquid according to claim 4, wherein said water is contained in an amount ranging from 10 to 95% based on the total weight of the recording liquid.

6. A recording liquid according to claim 4, wherein said water-soluble organic solvent is contained in an amount ranging from 5 to 90% based on the total weight of the recording liquid.

7. An ink-jet recording method comprising applying a droplet of a recording liquid to a recording medium to carry out recording, wherein said recording liquid comprises a dye (A) C.I. Reactive Red 23 and a dye (B) represented by the following general formula; said dyes being contained in a proportion ranging from 10:1 to 1:10 in weight ratio,

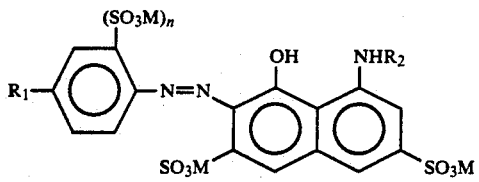

wherein $R_1$ represents a hydrogen atom, a halogen atom, a carboxyl group, or an alkyl group; $R_2$ represents a group $-COCH_3$,

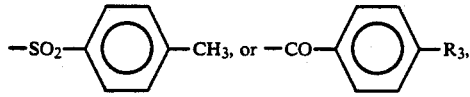

where $R_3$ represents a hydrogen atom or a chlorine atom; M represents a base selected from the group consisting of an alkali metal group, and an ammonium group; and n represents either 0 or 1.

8. An ink-jet recording method according to claim 7, wherein said ink-jet recording method employs a system in which a heat energy is applied to the recording liquid to cause droplets of the recording liquid to be ejected from an orifice.

9. An ink-jet recording method according to claim 7, wherein said recording medium is a coated paper containing silica on its surface.

10. An ink-jet recording method according to claim 7, wherein said dyes (A) and (B) are mixed in a proportion ranging from 7:3 to 3:7 in weight ratio.

11. An ink-jet recording method according to claim 7, wherein said dye (B) represented by said general formula is a dye represented by the following formula:

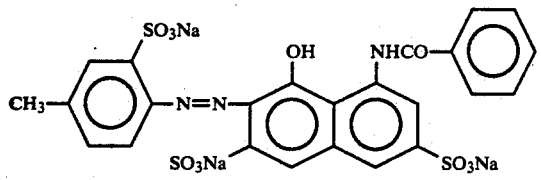

12. An ink-jet recording method according to claim 7, wherein said recording liquid comprises water and a water-soluble organic solvent as liquid medium.

13. An ink-jet recording method according to claim 12, wherein said water is contained in an amount ranging from 10 to 95% based on the total weight of the recording liquid.

14. An ink-jet recording method according to claim 12, wherein said water-soluble organic solvent is contained in an amount ranging from 5 to 90% based on the total weight of the recording liquid.

15. An ink-jet device comprising an ink storing member impregnated with ink comprising a recording agent and a liquid medium to dissolve or disperse said recording agent, wherein said recording agent comprises a dye (A) C.I. Reactive Red 23 and a dye (B) represented by the following general formula

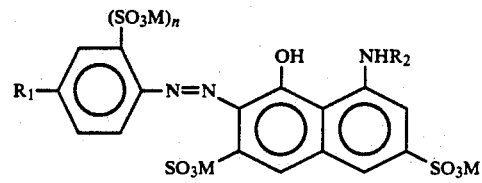

wherein $R_1$ represents a hydrogen atom, a halogen atom, a carboxyl group, or an alkyl group; $R_2$ represents a group

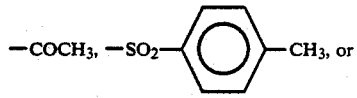

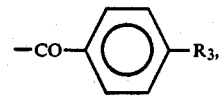

where $R_3$ represents a hydrogen atom or a chlorine atom; M represents a base selected from the group consisting of an alkali metal group, and an ammonium group; and n represents either 0 to 1; and said dyes being contained in a proportion ranging from 10:1 to 1:10 in weight ratio, and a head having a plurality of orifices for ejecting said ink as ink droplets.

16. An ink-jet device according to claim 15, wherein said ink storing member is an ink absorber or an ink bag.

17. An ink-jet device according to claim 15, wherein said head has a heating head to provide to the ink a heat energy for discharging the ink droplets.

18. An ink-jet device according to claim 15, wherein said dyes (A) and (B) are mixed in a proportion ranging from 7:3 to 3:7 in weight ratio.

19. An ink-jet device according to claim 15, wherein said dye (B) represented by said general formula is a dye represented by the following formula:

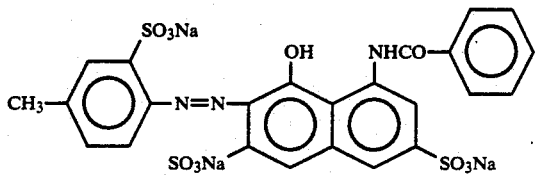

20. An ink-jet device according to claim 15, wherein said recording liquid comprises water and a water-soluble organic solvent as liquid medium.

21. An ink-jet device according to claim 20, wherein said water is contained in an amount ranging from 10 to 95% based on the total weight of the recording liquid.

22. An ink-jet device according to claim 20, wherein said water-soluble organic solvent is contained in an amount ranging from 5 to 90% based on the total weight of the recording liquid.

23. An ink-jet recording apparatus comprising an ink jet device comprising an ink storing member impregnated with ink comprising a recording agent and a liquid medium to dissolve or disperse said recording agent, wherein said recording agent comprises a dye (A) C.I. Reactive Red 23 and a dye (B) represented by the following general formula

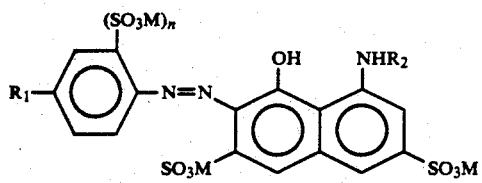

wherein $R_1$ represents a hydrogen atom, a halogen atom, a carboxyl group, or an alkyl group; $R_2$ represents a group

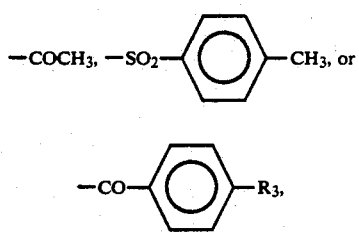

where $R_3$ represents a hydrogen atom or a chlorine atom; M represents a base selected from the group consisting of an alkali metal group, and an ammonium group; and n represents either 0 or 1; and said dyes being contained in a proportion ranging from 10:1 to 1:10 in weight ratio, and a head having a plurality of orifices for ejecting said ink as ink droplets.

24. An ink-jet recording apparatus according to claim 23, wherein said ink storing member is an ink absorber or ink bag.

25. An ink-jet recording apparatus according to claim 23, wherein said head has a heating head to provide to the ink a heat energy for discharging the ink droplets.

26. An ink-jet recording apparatus according to claim 23, wherein said dyes (A) and (B) are mixed in a proportion ranging from 7:3 to 3:7 in weight ratio.

27. An ink-jet recording apparatus according to claim 23, wherein said dye (B) represented by said general formula is dye represented by the following formula:

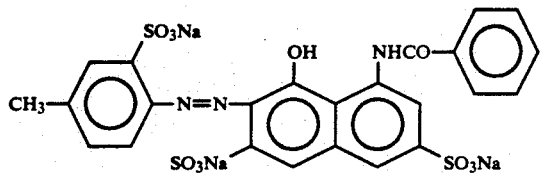

28. An ink-jet recording apparatus according to claim 23, wherein said recording liquid comprises water and a water-soluble organic solvent as liquid medium.

29. An ink-jet recording apparatus according to claim 28, wherein said water is contained in an amount ranging from 10 to 95% based on the total weight of the recording liquid.

30. An ink-jet recording apparatus according to claim 28, wherein said water-soluble organic solvent is contained in an amount ranging from 5 to 90% based on the total weight of the recording liquid.

31. An ink cartridge comprising an ink bag impregnated with ink comprising a recording agent and a liquid medium to dissolve or disperse said recording agent, wherein said recording agent comprises a dye (A) C.I. Reactive Red 23 and a dye (B) represented by the following general formula

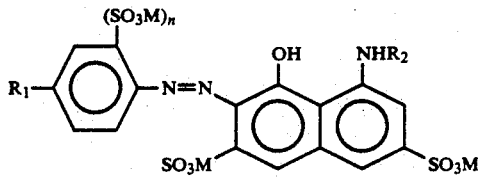

wherein $R_1$ represents a hydrogen atom, a halogen atom, a carboxyl group, or an alkyl group; $R_2$ represents a group

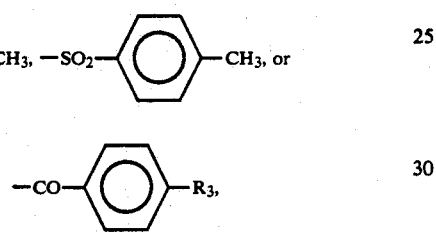

where $R_3$ represents a hydrogen atom or a chlorine atom; M represents a base selected from the group consisting of an alkali metal group, and an ammonium group; and n represents either 0 or 1; and said dyes being contained in a proportion ranging from 10:1 to 1:10 in weight ratio.

32. An ink cartridge according to claim 31, wherein said dyes (A) and (B) are mixed in a proportion ranging from 7:3 to 3:7 in weight ratio.

33. An ink cartridge according to claim 31, wherein said dye (B) represented by said general formula is a dye represented by the following formula:

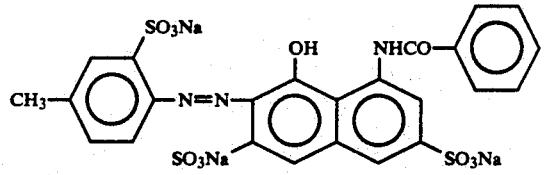

34. An ink cartridge according to claim 31, wherein said recording liquid comprises water and a water-soluble organic solvent as liquid medium.

35. An ink cartridge according to claim 31, wherein said water is contained in an amount ranging from 10 to 95% based on the total weight of the recording liquid.

36. An ink cartridge according to claim 31, wherein said water-soluble organic solvent is contained in an amount ranging from 5 to 90% based on the total weight of the recording liquid.

* * * * *

UNITED STATES PATENT AND TRADEMARK OFFICE
CERTIFICATE OF CORRECTION

PATENT NO. : 5,074,914

DATED : December 24, 1991

INVENTOR(S) : Katsuhiro Shirota, et al.

It is certified that error appears in the above-identified patent and that said Letters Patent is hereby corrected as shown below:

COLUMN 1:

Line 13, "relates a" should read --relates to a--;
  Line 23, "solvent" should read --solvents--.

COLUMN 6:

Line 6, "glycol" should read --glycols--;
  Line 61, "type the" should read --type in which the--.

COLUMN 10:

Line 29, "criterions" should read --criteria--.

Signed and Sealed this

Eighteenth Day of May, 1993

Attest:

MICHAEL K. KIRK

Attesting Officer      Acting Commissioner of Patents and Trademarks